United States Patent [19]

Eskandry et al.

[11] Patent Number: 4,913,211

[45] Date of Patent: * Apr. 3, 1990

[54] AUTOMOBILE WINDOW SHADE CONVERTIBLE TO HORIZONTAL EXPANSION OR VERTICAL EXPANSION

[76] Inventors: Ezra D. Eskandry, 1925 Brickell Ave., D901, Miami, Fla. 33131; Eli Weinberg, 13367 SW. 46th La., Miami, Fla. 33175

[*] Notice: The portion of the term of this patent subsequent to Jun. 13, 2006 has been disclaimed.

[21] Appl. No.: 350,223

[22] Filed: May 11, 1989

Related U.S. Application Data

[63] Continuation-in-part of Ser. No. 266,068, Nov. 2, 1988, Pat. No. 4,838,335.

[51] Int. Cl.4 ............................................. A47H 5/00
[52] U.S. Cl. ................................ 160/84.1; 160/370.2; 296/97.8
[58] Field of Search ........................... 160/84.1, 370.2; 296/97.8, 97.1; 229/917

[56] References Cited

U.S. PATENT DOCUMENTS 4,671,334 6/1987 Yadegar et al. ............... 296/97.8 X
4,777,994 10/1988 Nederveld ..................... 296/97.8 X Primary Examiner—Blair M. Johnson Attorney, Agent, or Firm—Robert C. Kain, Jr.

[57] ABSTRACT

The foldable automobile window shade generally includes a first plurality of substantially rigid, planar elements joined together by hinges such that they form a first accordion fold portion of the shade. The shade also includes a second plurality of rigid, planar elements forming a second accordion fold portion of the shade. The shade also includes a hinge that links the first and second accordion fold portions. The hinge may be a pop-out tab in one of the elements forming the first accordion fold portion which cooperates with a through passage in one of the elements forming the second accordion fold portion. In another embodiment, the hinge may be a clip having depending and upstanding U-shaped legs that grip the elements in either the horizontal expansion mode or the vertical expansion mode. The planar elements forming the accordion fold portions may be triangularly shaped such that the hinge linking the first and second fold portions is angularly displaced with respect to the fold lines in the fold portions. With triangularly shaped elements, one of the fold portions can be configured to form a solid triangular body or pyramid that notifies others of an emergency situation. In that embodiment, the further hinge cooperates with a through passage in a remote triangular element thereby forming the solid, triangular body.

10 Claims, 5 Drawing Sheets

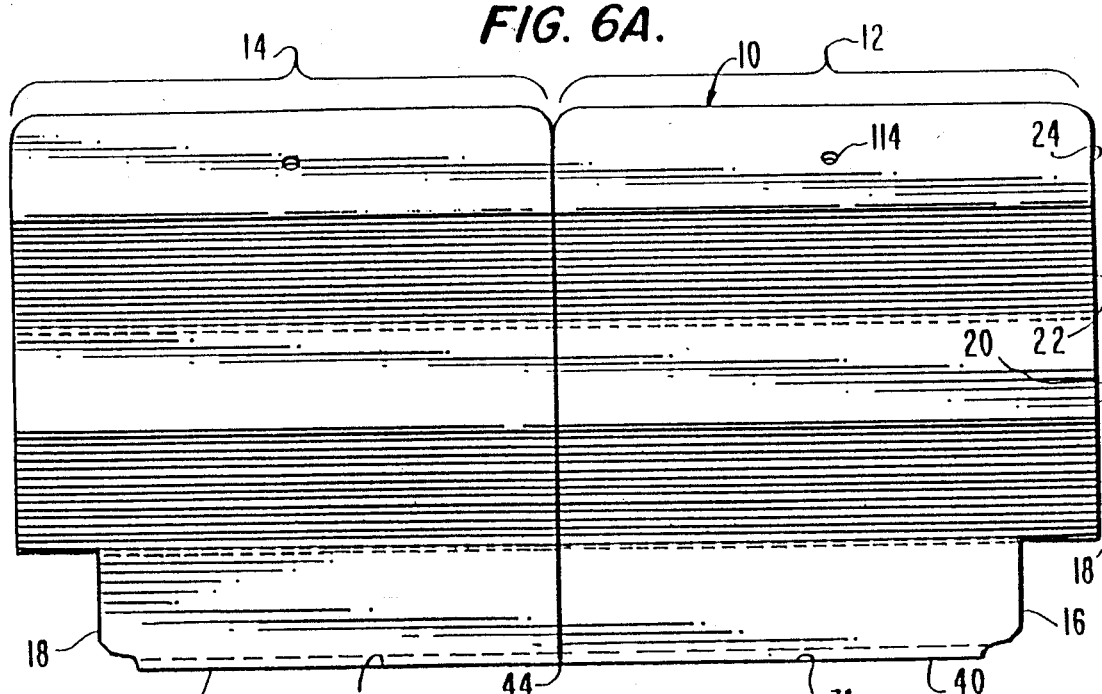
FIG. 6A.
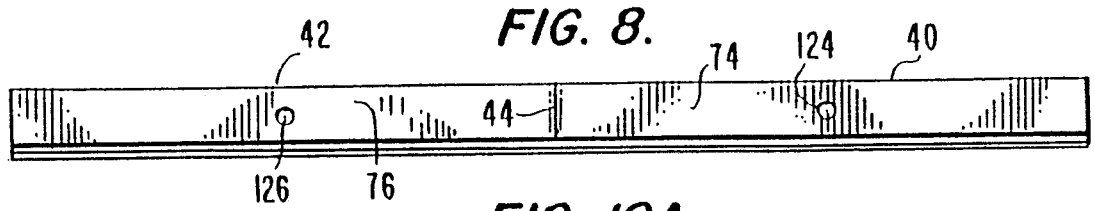
FIG. 7.
FIG. 8.
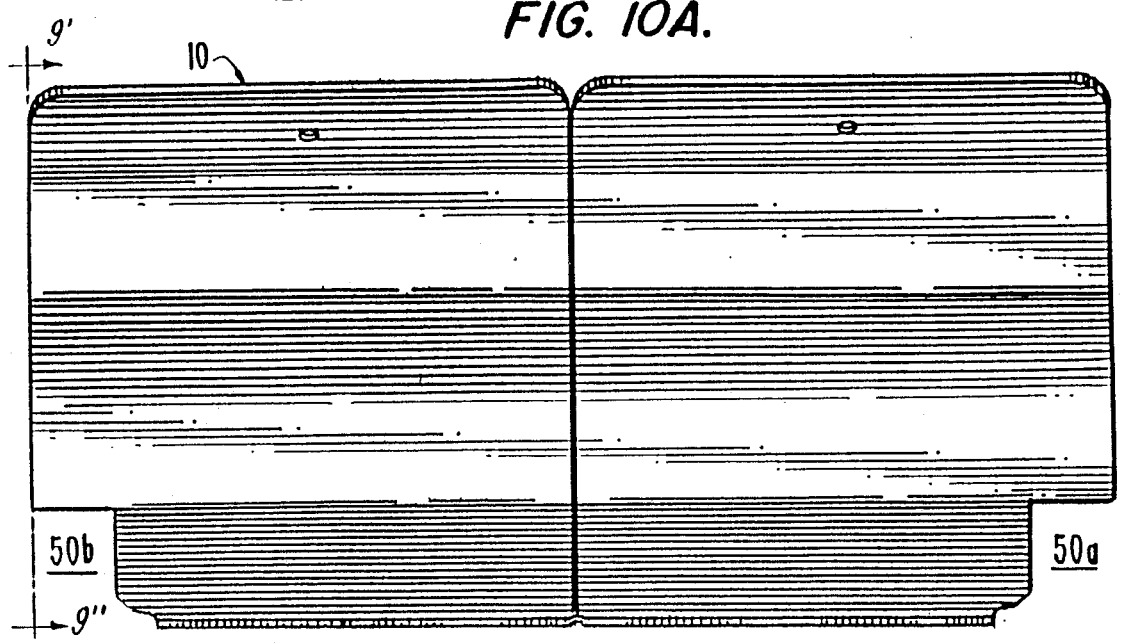
FIG. 10A.

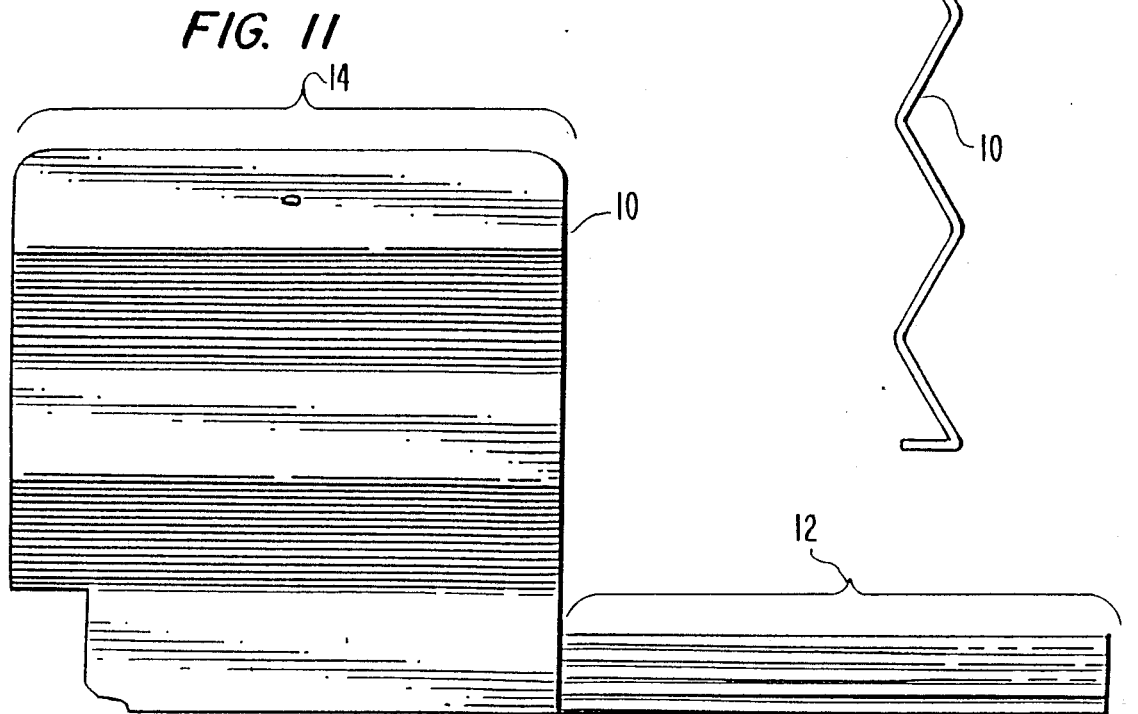
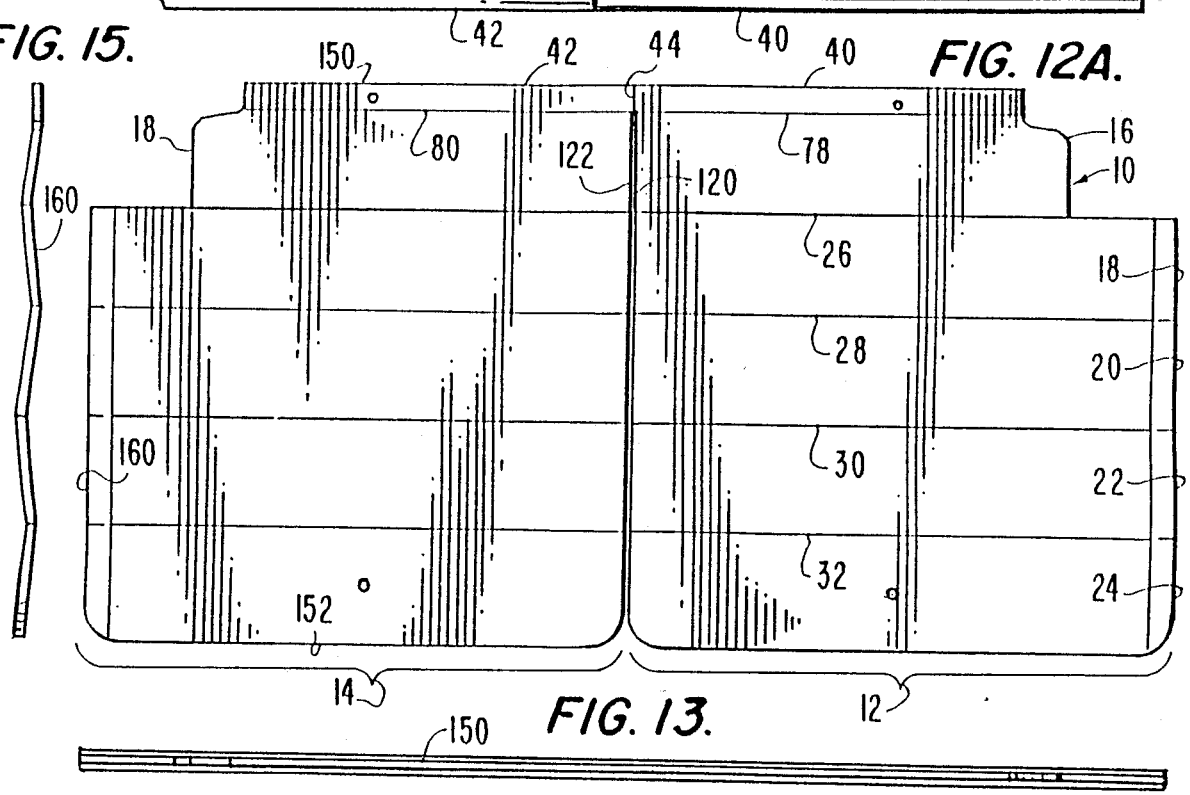

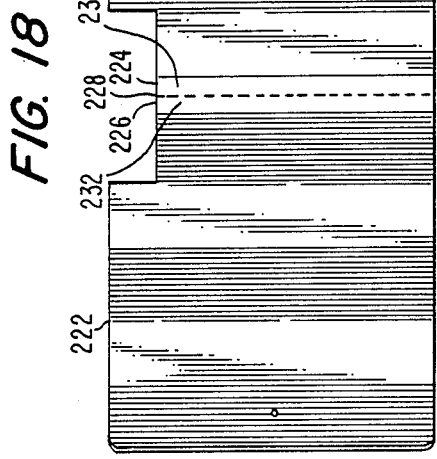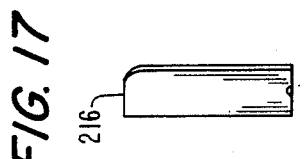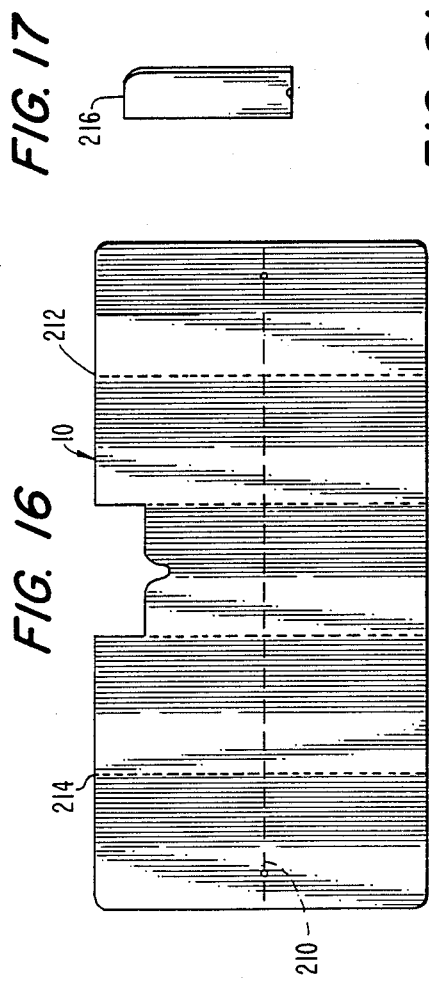

AUTOMOBILE WINDOW SHADE CONVERTIBLE TO HORIZONTAL EXPANSION OR VERTICAL EXPANSION

This is a continuation-in-part of U.S. patent application Ser. No. 266,068, filed Nov. 2, 1988, now U.S. Pat. No. 4,838,335.

BACKGROUND OF THE INVENTION

The present invention relates to an automobile window shade and particularly to a shade that can be horizontally expanded to cover the front windshield and can be vertically expanded, in another mode, to cover the rear windshield.

When an automobile is sealed by closure of all of its windows, the temperature inside the automobile rises if sunlight enters the window and is converted into heat. In order to block a significant portion of this sunlight, foldable window shades have been developed. U.S. Pat. No. 4,202,396 to Levy discloses such a foldable sunshield or window shade for an automobile. The Levy sunshield is only horizontally expandable. As used herein, the term "horizontally expandable" refers to a sunshield that can be expanded such that its width is increased dependent upon the increasingly greater angles formed by the accordion folds of the shade. Also as used herein, the term "vertically expandable" refers to a shade whose height can be altered dependent upon the angle between the accordion folds.

OBJECTS OF THE INVENTION

It is an object of the present invention to provide a foldable automobile window shade that has two modes, a vertically expandable mode and a horizontally expandable mode.

It is another object of the present invention to provide an automobile window shade that is an integral structure.

It is a further object of the present invention to provide an automobile window shade that can be collapsed into a compact structure.

It is another object of the present invention to provide an automobile window shade wherein the shade can be configured in different modes in different automobile windows.

It is an additional object of the present invention to provide a pop-out tab that operates as a hinge linking first and second accordion fold portions of the shade.

It is another object of the present invention to provide a shade that has a separable seam which, when opened, forms the first and second accordion fold portions.

It is a further object of the present invention to configure the further hinge as a distinct component such as a clip, strap or other independent object.

It is another object of the present invention to provide triangularly shaped accordion fold portions, one of which can be configured as a solid triangular body for emergencies.

SUMMARY OF THE INVENTION

The foldable automobile window shade generally includes a first plurality of substantially rigid, planar elements joined together by hinges such that they form a first accordion fold portion of the shade. The shade also includes a second plurality of rigid, planar elements forming a second accordion fold portion of the shade. The shade also includes a hinge that links the first and second accordion fold portions. The hinge may be a pop-out tab in one of the elements forming the first accordion fold portion which cooperates with a through passage in one of the elements forming the second accordion fold portion. In another embodiment, the hinge may be a clip having depending and upstanding U-shaped legs that grip the elements in either the horizontal expansion mode or the vertical expansion mode. The planar elements forming the accordion fold portions may be triangularly shaped such that the hinge linking the first and second fold portions is angularly displaced with respect to the fold lines in the fold portions. With triangularly shaped elements, one of the fold portions can be configured to form a solid triangular body or pyramid that notifies others of an emergency situation. In that embodiment, the further hinge cooperates with a through passage in a remote triangular element thereby forming the solid, triangular body.

BRIEF DESCRIPTION OF THE DRAWINGS

Further objects and advantages of the present invention can be found in the detailed description of the preferred embodiment when taken in conjunction with the accompanying drawings in which:

FIG. 6A illustrates a front elevational view of the automobile window shade in the vertical expansion mode;

FIGS. 7 and 8 respectively illustrate top and bottom views of the automobile window shade in the vertical expansion mode;

FIG. 9 illustrates a side view of the automobile window shade in the vertical expansion mode from the perspective of section line 9'-9" in FIG. 10A;

FIG. 10A illustrates a rear elevational view of the automobile window shade in the vertical expansion mode;

FIG. 11 illustrates a shade in a partially expanded and partially collapsed vertical mode;

FIG. 12A illustrates the automobile window shade in a substantially flattened and laid out position;

FIGS. 13, 14 and 15 illustrate, respectively, the upper side view, lower side view, and left side view of the automobile window shade in the substantially flattened and laid out position illustrated in FIG. 12A;

FIG. 16 illustrates a front elevational view of the automobile window shade having a laterally extending crease;

FIG. 17 illustrates the window shade in its compact form folded along the lateral crease;

FIG. 18 is a front elevational view of another embodiment of the automobile window shade showing the separable seam along adjacent edges of the first and second accordion fold portions;

FIG. 19 is a detailed view of the further hinge embodied as a pop-out tab and a pop-out through passage for the tab;

FIG. 20 diagrammatically illustrates the further hinge as a pop-up tab when the window shade is in the horizontal expansion mode;

FIG. 21 diagrammatically illustrates the further hinge as a pop-up tab when the window shade is in a vertical expansion mode;

FIG. 22 diagrammatically illustrates another embodiment of the further hinge wherein the hinge is a distinct component;

FIG. 23 is another embodiment of the hinge as a clip when the window shade is in the horizontal expansion mode;

FIG. 24 is a partial cross-sectional view of the clip from the perspective of section line 24'-24" in FIG. 23;

FIG. 25 is a view of the clip as the further hinge when the window shade is in the vertical expansion mode;

FIG. 26 is a front elevational view of the window shade in the horizontal expansion mode when the shade defines triangular planar elements;

FIG. 27 is a partial cross-sectional view of the interfacing elements of the window shade illustrated in FIG. 26 and particularly shows the further hinge embodied as a pop-out tab; and FIG. 28 illustrates the solid, triangular body or pyramid defined by some of the triangular elements shown in FIG. 26.

DETAILED DESCRIPTION OF THE PREFERRED EMBODIMENT

The present invention relates to an automobile window shade that is convertible to a vertically expandable mode and a horizontally expandable mode.

Figure 1A:
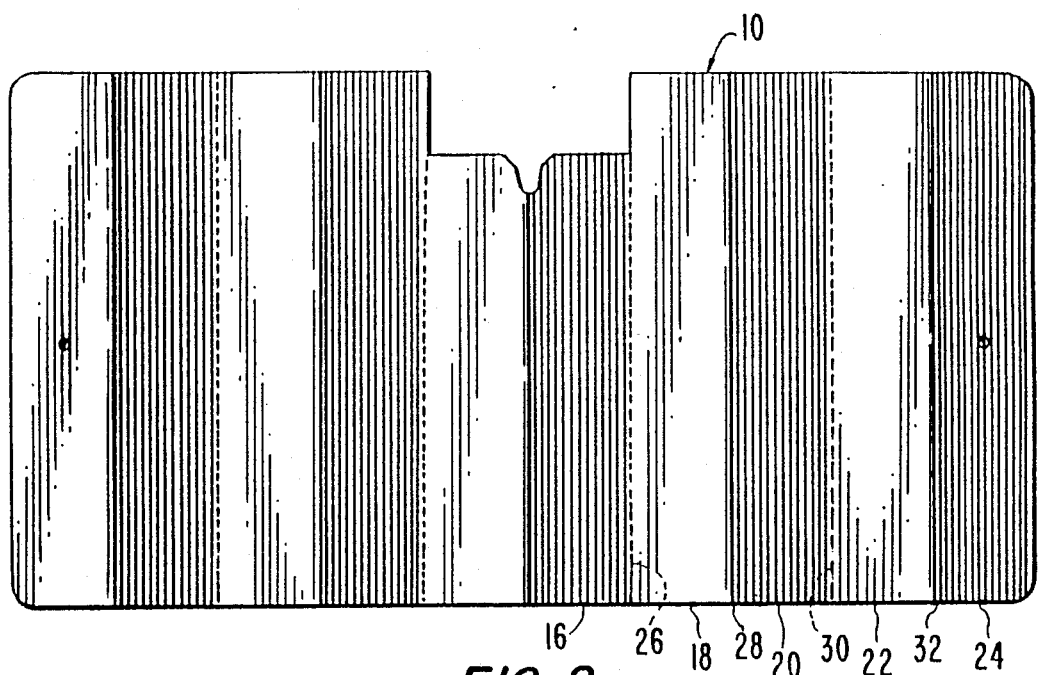
FIG. 1A illustrates a front elevation view of the automobile window shade in the horizontal expansion mode.
Figure 2:
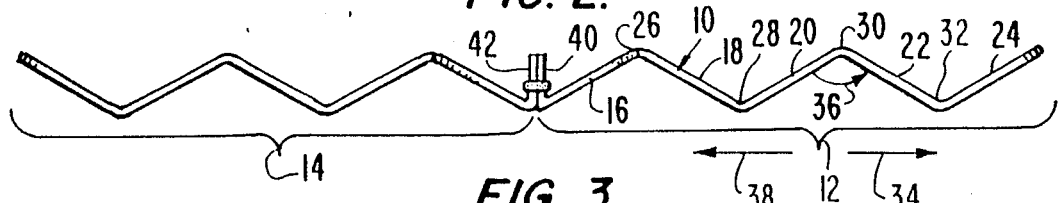
FIGS. 2 and 3 respectively illustrate a top view and a bottom view of the automobile window shade in the horizontal expansion mode.
Figure 3:
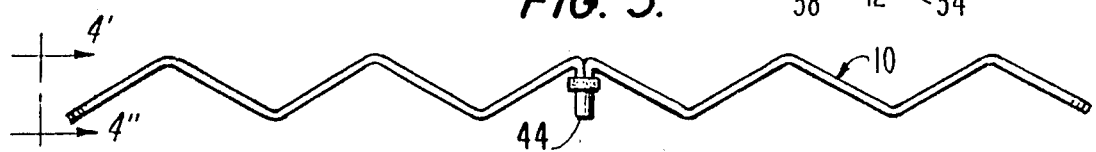
Figures 4, 5A:
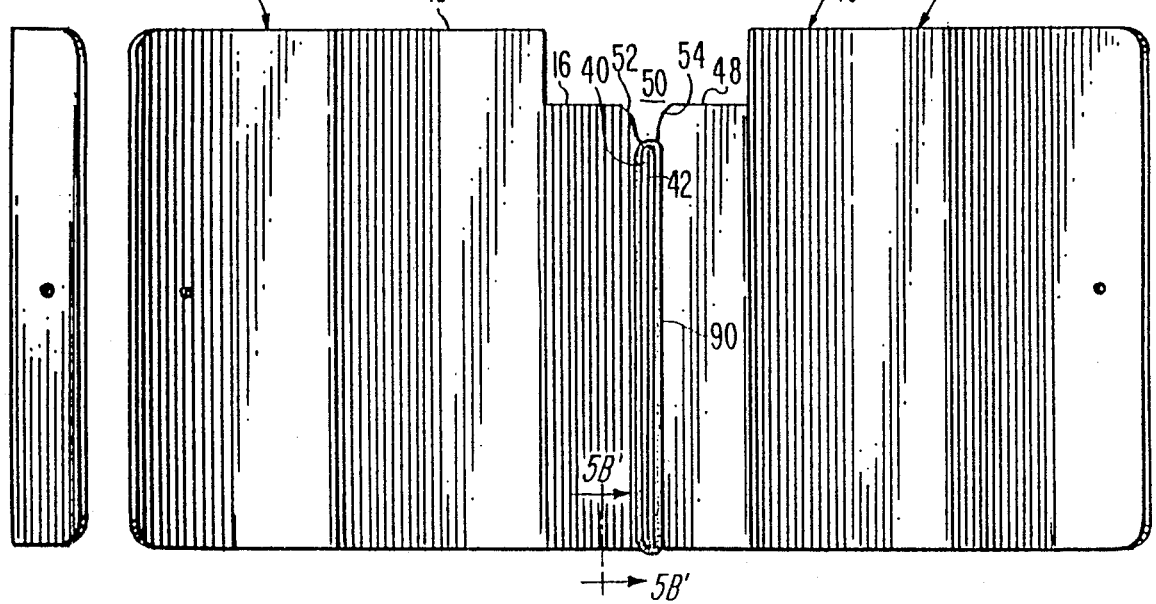
FIG. 4 illustrates a side view of of the automobile window shade in the horizontal expansion mode from the perspective of section line 4'-4" in FIG. 3.
FIG. 5A illustrates a rear elevational view of the automobile window shade in the horizontal expansion mode.

FIGS. 1A, 1B, 2, 3, 4, 5A, 5B and 5C show window shade 10 in a horizontally expandable mode. FIGS. 1A and 5A show, respectively, the front and rear elevational views of window shade 10. Shade 10 includes a first accordion fold portion 12 and a second accordion fold portion 14 best illustrated in FIG. 2. Portion 12 includes rigid, planar elements 16, 18, 20, 22 and 24. These planar elements are joined together along longitudinal edges by accordion folds. In other words, planar elements 16 or 18 are joined along accordion fold 26; elements 18 or 20 are joined by fold 28; elements 20 and 22 are joined by fold 30; and elements 22 and 24 are joined by fold 32. These accordion folds enable portion 12 to be expanded in the direction of arrow 34, i.e., outboard from the center, by increasing the angle 36, which is called herein the "accordion angle". Accordion fold portion 12 can be collapsed by decreasing angle 36 by moving the elements in the direction of arrow 38.

Accordion fold portion 12 also includes planar end element 40. Accordion fold portion 14 includes a plurality of rigid, planar elements and an end element 42. End elements 40 and 42 are joined together by single, modal hinge 44 which is illustrated in the bottom view of shade 10 in FIG. 3.

FIG. 5A illustrates the rear elevational view of the window shade in the first or horizontally expandable mode. End elements 40 and 42 and adjacent elements 16 and 48 have a length that is less than the length of the remaining elements, such as element 18, in their respective accordion fold portions 12 and 14. The shorter length of elements 16 and 48 form a cutout 50. Additionally, the inboard edges 52 and 54 of elements 16 and 48 are further trimmed to define nose cutout 52.

Figure 1B:
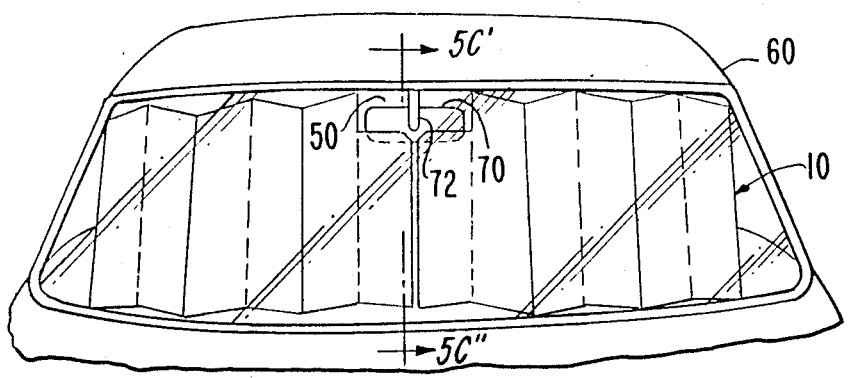
FIG. 1B illustrates a perspective view of the automobile window shade in the horizontal expansion mode shading the interior of the front window of an automobile.

FIG. 1B illustrates foldable window shade 10 disposed in the interior of an automobile 60. Shade 10 includes seven planar elements inclusive of the end planar element, one of which is end element 62 shown in FIG. 5C. FIG. 5C is a cross-sectional view of the window shade from the perspective of section line 5C'-5C" in FIG. 1B. Rear view mirror 70 is disposed in cutout 50 of window shade 10 and the nose portion of the cutout is close to stem 72 of rear view mirror 70.

Figure 5B:
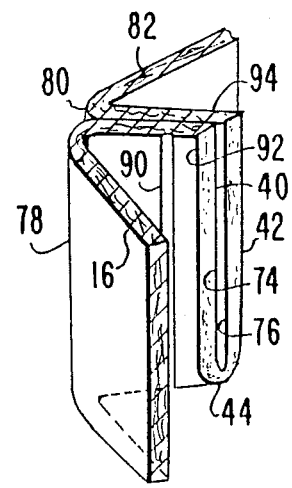
FIG. 5B illustrates a detail view of the modal hinge of the automobile window shade from the perspective of section line 5B' in FIG. 5A.
Figure 5C:
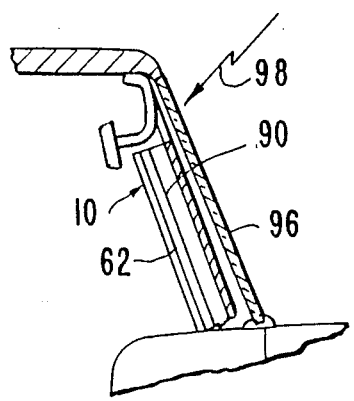
FIG. 5C illustrates a cross-sectional view of the automobile window shade in the horizontal expansion mode when the shade is placed behind the front window of an automobile.

FIG. 5B illustrates a detail perspective view of the bottom region of the adjacent end elements from the perspective of section line 5B' in FIG. 5A. End elements 40 and 42 have planar surfaces 74 and 76, respectively. These planar surfaces are adjacent each other when the window shade is in the horizontally expandable mode. Elements 40 and 42 have longitudinal edges that are joined, via accordion hinges 78 and 80, to elements 16 and 82, respectively. End elements 40 and 42 are joined together via a single modal hinge 44. Hinge 44 enables the shade to be converted into different modes, hence the term "modal hinge".

In a preferred embodiment, window shade 10 is an integral structure made of a cardboard material. Therefore, elements 40 and 42 are part of a common element that is associated with the first accordion fold portion 12 and the second accordion fold portion 14.

In order to keep the planar surfaces 74 and 76 closely adjacent, a means for biasing, in this embodiment a rubberband 90, encircles the outboard surfaces 92 and 94 of end elements 40 and 42. Rubberband 90 could be replaced by a coil spring or any other attachment mechanism such that surfaces 74 and 76 are brought adjacent each other. This could include snaps, velcro or any other type of easily removable attachment mechanism.

In FIG. 5C, window shade 10 is illustrated as being close to the interior surface of windshield 96. Sunlight, shown by arrow 98, would pass through window 96 but would be reflected or deflected by window shade 10. The inward protrusion of end elements 40 and 42 provide a stand such that in the horizontally expandable mode, the window shade stands upright and supports itself.

FIGS. 6A, 6B, 7, 8, 9, 10A, 10B and 10C show shade 10 in the second or vertically expandable mode. An important feature of the invention is the modal hinge 44 that enables the window shade to be converted from the horizontal mode to the vertical mode. In the vertical mode, end elements 40 and 42 are substantially co-planar with respect to each other. See, for example, FIGS. 8, 9 and 10B. Therefore, in order to convert the shade from the horizontal to the vertical mode, planar surfaces 74 and 76 are moved apart until end elements 40 and 42' are generally co-planar. In the vertical mode, elements 16, 18, 20, 22 and 24 of accordion fold portion 12 are disposed above end element 40. The same is true with respect to accordion fold portion 14 and end element 41; element 18 is disposed above end element 42 in FIG. 6A.

Figure 6B:
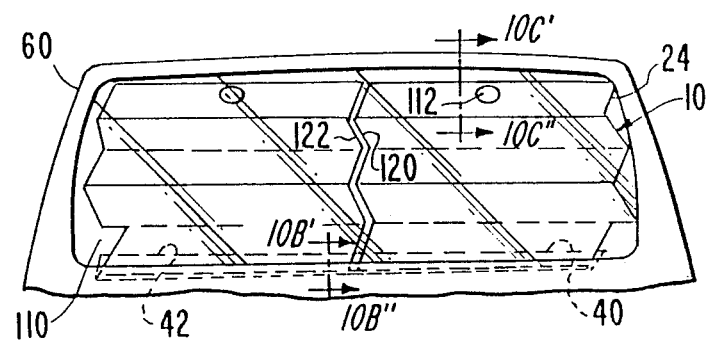
FIG. 6B illustrates the automobile window shade in the vertical expansion mode when the shade is placed in the rear window of an automobile.
Figure 10C:
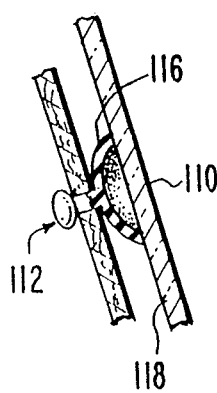
FIG. 10C illustrates a detail, cross-sectional view of the mounting mechanism for the automobile window shade in the vertical expansion mode from the perspective of section line 10C' in FIG. 6B.

FIG. 6B illustrates window shade 10 blocking the interior surface of rear windshield 110 of automobile 60. In order to attach element 24, the element remote from end element 40, to rear windshield 110, the shade includes a mounting means 112. Mounting means 112 extends through hole 114, shown in FIG. 6A, in element 24. A detailed, cross-sectional view of one type of mounting means 112 is shown in FIG. 10C. In this embodiment, mounting means 112 is a suction cup 116 that attaches to the interior surface 118 of window 110. Other mountings could be utilized. For example, element 24 could be connected via a velcro attachment to the interior liner of the automobile. Alternatively, a hook and eye combination could be utilized with respect to the window (using a suction cup) or with respect to the interior roof of the automobile.

FIGS. 7 and 8, respectively, illustrate the top and bottom views of window shade 10. FIG. 7 shows that hole 114 and hole 120 are available for mounting the elements most remote from end elements 40 and 42. FIG. 8 illustrates the commonality between elements 40 and 42 via modal hinge 44. End elements 40 and 42 also include mounting holes 124 and 126 which enable these end elements to be secured to the rear dashboard below rear window 110.

FIG. 10A illustrates a rear elevational view of shade 10 in the vertically expandable mode. The separated cutout sections 50a and 50b do not present a significant problem in blocking light entering through rear window 110 shown in FIG. 6B due to their low position in the shade.

FIG. 9 illustrates a side view of shade 10 from the perspective of section line 9'-9'' in FIG. 10A.

Figure 10B:
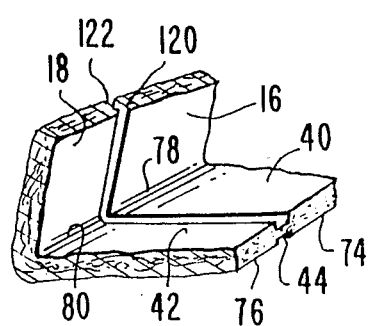
FIG. 10B illustrates a detail, perspective view of the modal hinge when the shade is in the vertical expansion mode from the perspective of section line 10B' in FIG. 6B.

FIG. 10B illustrates a detail, perspective view of modal hinge 44 from the perspective of section line 10B' in FIG. 6B. FIG. 10B shows that end elements 40 and 42 are co-planar. Adjoining elements 16 and 18 extend above end elements 40 and 42 due to accordion folds 78 and 80. In the vertically expandable mode, edges 120 of accordion fold portion 12 and edges 122 of accordion fold portion 14 (see FIGS. 6B and 10B) are closely adjacent to each other.

FIG. 11 shows that window shade 10 can be partially collapsed in the vertical expansion mode. In FIG. 11, accordion fold portion 12 has been collapsed on top of end element 40 but accordion fold portion 14 is still vertically expanded above end element 42. This capability of the shade enables the automobile driver to have limited vision out of the rear window and yet still block or screen a significant portion of the sunlight entering the window.

Figure 12B:
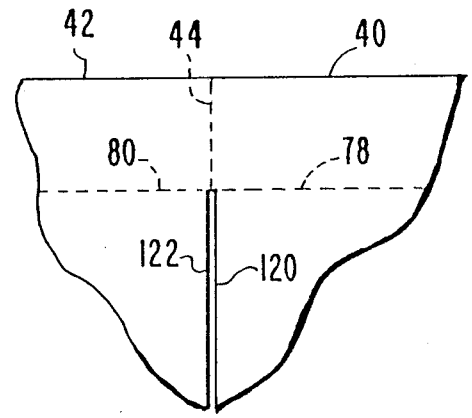
FIG. 12B illustrates a detail view of the modal hinge.

FIGS. 12A, 12B, 13, 14 and 15 illustrate various views of window shade 10 in a substantially flat and laid out position. Elements 40 and 42 are shown as being common and being joined by modal hinge 44. FIG. 12B is a detail view of modal hinge 44. Modal hinge 44 is shown by dashed lines, as are accordion folds 78 and 80.

FIGS. 13, 14 and 15, respectively, show upper edge 150, lower edge 152 and side edge 160 of the substantially flat and laid out views of shade 10. In one embodiment, a sheet of cardboard is cut to form accordion fold portion 12 and accordion fold portion 14, thereby forming edge 122 and edge 120. The common element consisting of end elements 40 and 42 and modal hinge 44 is not cut. See FIG. 12B for a detailed view. Fold lines are placed in the cardboard to achieve accordion folds 78, 26, 28, 30, 32 in fold portion 12, as well as accordion fold 80 and the other unnumbered folds in fold portion 14.

Preferably, the shade is made of a cardboard material. However, it is possible to make the shade of a plastic or other lightweight material. The hinges, both modal hinge 44 and the accordion hinges, may be integral or may be a separate structure.

FIG. 16 is a front elevational view of window shade 10 having a laterally extending crease 210 that is impressed into accordion portion 212 as well as accordion portion 214. With laterally extending crease 210, automobile shade 10 can be folded about the crease and then the accordion folds can be retracted to form compact shade 216 (FIG. 17).

FIG. 18 illustrates another embodiment of the present invention. Automobile shade 218 is defined by accordion fold portion 220 and accordion fold portion 222. FIG. 18 is a front elevational view of shade 218. Accordion fold portion 218 includes adjacent element 224 and fold portion 222 includes adjacent element 226. Adjacent elements 224 and 226 are initially joined together by separable seam 228. Seam 228 can be a score line such that the person using the shade can cut it or it can be a perforated line. The separable seam, when opened, would enable planar faces 230 and 232 to be facing each other when shade 218 is in a horizontal expansion mode. This would be generally similar to adjacent elements 40 and 42 illustrated in FIG. 2 above. Shade 218 may further include a hinge similar to modal hinge 44 shown in FIG. 3 above. However, in the illustrated embodiment, modal hinge 44 is replaced by a different type of hinge that is shown in detail in FIG. 19.

FIG. 19 is a detailed view of adjacent planar elements 224 and 226 showing a pop-out tab 230 that operates as the further or modal hinge. Pop-out tab 230 includes tab body 232 and tab head 234. Tab head 234 is distinguished from tab body 232 by fold or crease line 236. Tab body 232 is attached to planar element 224 by crease 238. The remainder of the periphery of tab 230 is perforated or scored such that tab 230 can be popped-out of planar element 224. The tab is hinged to element 224 via fold crease 238. On planar element 226 is a through passage that is formed by pop-out section 240. Pop-out section 240 is completely removable and, hence, is distinguished from planar section 226 by perforations or score lines.

FIG. 20 diagrammatically illustrates adjacent planar elements 224 and 226 disposed next to each other and held by tab 230. Tab head 234 is folded along crease 236 and is not sandwiched between elements 224 and 226 but tab body 232 is disposed between elements 224 and 226. In this mode of operation, the other elements or sections of the accordion fold portions extend laterally or horizontally on either side of planar elements 224 and 226.

FIG. 21 diagrammatically illustrates the vertical expansion mode of the shade wherein planar elements 224 and 226 are substantially co-planar with respect to each other. In this embodiment, tab 230 has a tab body 232 that extends between and generally links planar sections 224 and 226.

FIG. 22 illustrates another embodiment, and particularly illustrates the hinge being a distinct item or component. FIG. 22 diagrammatically illustrates the vertical expansion mode of the invention with planar elements 224 and 226 substantially co-planar. A hinge element 260 couples elements 224 and 226 together. Hinge element 260 has a foldable seam 262 such that planar element 226 can be moved counterclockwise in direction A and planar element 224 can be moved clockwise in direction B such that hinge element 260 folds upon itself. Hinge element 260 is attached to the planar elements via clips or snaps 264 and 266.

FIGS. 23, 24 and 25 illustrate another embodiment of the present invention utilizing a clip 270 as the further modal hinge. Clip 270 has two, oppositely extending, U-shaped legs 272 and 274 (FIG. 25). When the shade is in the horizontal expansion mode, and planar elements 224 and 226 have planar surfaces that are adjacently disposed next to each other, only one pair of the U-shaped legs of clip 270 retains the planar elements as shown in FIG. 24. When the shade is in the vertical expansion mode, each pair of U-shaped legs 272 and 274 grips oppositely and co-planarly disposed shade elements 226 and 224. Clip 270 may be flexible and operate as the hinge in FIG. 22. In that case, the legs would resiliently grip the shade elements.

FIG. 26 illustrates another embodiment of the automobile shade wherein the shade is made of triangularly shaped elements 300, 302, 306, 308 and 309. The first plurality of elements consists of triangular sections 300, 302, 304 and 306. The second plurality of elements consists of triangular sections 308 and 309. These elements interact in an accordion fold fashion since the elements can be horizontally expanded and retracted by increasing or decreasing the angle between the various folds. Other shapes for the accordion fold portions are possible, such as octagonally shaped elements. In such embodiments, the further hinge is angularly disposed with respect to the accordion folds.

FIG. 27 illustrates a partial, detailed view of the interfacing portions of two adjacent accordion fold sections 306 and 308. Particularly, triangular section 306 includes interfacing planar element 310 that has a tab 312 extending therefrom. Triangular section 308 includes interfacing element 314 that has a through passage which cooperates with tab 312. Tab 312 forms the hinge as described above with respect to tab 230. A rubberband 316 ensures that interfacing surfaces of planar elements 310 and 314 are kept adjacent each other.

In the event of an emergency, one of the accordion fold portions can be detached from the other (by detaching tab 312) and can be configured as a solid triangular shape 410, shown in FIG. 28. Triangular sections 302, 304 and 306 form a solid triangle or pyramid and triangular section 300 is disposed in the interior or on the bottom of the solid triangular shape. Tab 312 cooperates with a through passage 370 (see FIG. 26) to link remote triangular section 302 with triangular section 306. The solid triangle could carry indicia such as "stop", "emergency" or "vehicle in distress". Other mechanisms, such as clips or straps, for attaching the adjacent triangular element to the remote triangular element are possible and these embodiments are meant to be encompassed by the claims.

The claims appended hereto are meant to cover modifications and changes within the spirit and scope of the present invention.

What is claimed is:

1. A foldable window shade for an automobile comprising:
 a first plurality of substantially rigid, planar elements joined together by hinges along adjoining edges such that said first plurality of elements form a first accordion fold portion;
 a second plurality of substantially rigid, planar elements joined together by hinges along adjoining edges such that said second plurality of elements form a second accordion fold portion;
 a further hinge linking one of said first plurality of elements and one of said second plurality of elements along adjacent edge portions of said first and second accordion fold portions.

2. A foldable window shade as claimed in claim 1 wherein said further hinge links adjacent edge portions that are normal to said accordion folds, and wherein said first and second plurality of elements each have a laterally extending crease, that is normal to said accordion folds, such that each said element can be folded in half.

3. A foldable window shade as claimed in claim 1 wherein said further hinge is defined by a pop-out tab extending from said one element of said first plurality of elements, and said one element of said second plurality of elements having a passage through which extends said tab when said first and second plurality of elements are linked together.

4. A foldable window shade as claimed in claim 1 wherein said further hinge is attached by a first attachment to said one element of said first plurality of elements and is attached by a second attachment to said one element of said second plurality of elements.

5. A foldable window shade as claimed in claim 1 wherein said further hinge is a detachable clip.

6. A foldable window shade for an automobile comprising:
 a first plurality of substantially rigid, planar elements joined together by hinges along adjoining edges such that said first plurality of elements form a first accordion fold portion;
 a second plurality of substantially rigid, planar elements joined together by hinges along adjoining edges such that said second plurality of elements form a second accordion fold portion;
 a further hinge linking one of said first plurality of elements and one of said second plurality of elements along adjacent edge portions in said first and second accordion fold portions, said further hinge being angularly disposed with respect to the accordion folds of said first and second plurality of elements.

7. A foldable window shade as claimed in claim 6 wherein said first and second plurality of planar elements are triangularly shaped.

8. A foldable window shade as claimed in claim 7 wherein said first plurality of elements includes at least three triangularly shaped elements, and said further hinge is attachable to a remote element via a further through passage such that a solid triangular shape is formed by said first plurality of elements when said further hinge is attached to said remote element.

9. A foldable window shade for an automobile comprising:

a first plurality of substantially rigid, planar elements joined together by hinges along adjoining edges such that said first plurality of elements form a first accordion fold portion;

a second plurality of substantially rigid, planar elements joined together by hinges along adjoining edges such that said second plurality of elements form a second accordion fold portion;

a separable seam between one of said first plurality of elements and one of said second plurality of elements along adjacent edges of said first and second accordion fold portions; and, a further hinge linking said one of said first plurality of elements and said one of said second plurality of elements along a portion of said adjacent edges in said first and second accordion fold portions when said separable seam is opened.

10. A foldable window shade as claimed in claim 9 wherein said further hinge is defined by a pop-out tab extending from said one element of said first plurality of elements, said one element of said second plurality of elements having a passage through which extends said tab when said first and second elements are linked together.

* * * * *